Sept. 23, 1924.
C. G. STRANDLUND
WHEEL PLOW
Original Filed Aug. 8, 1918    2 Sheets-Sheet 1
1,509,115
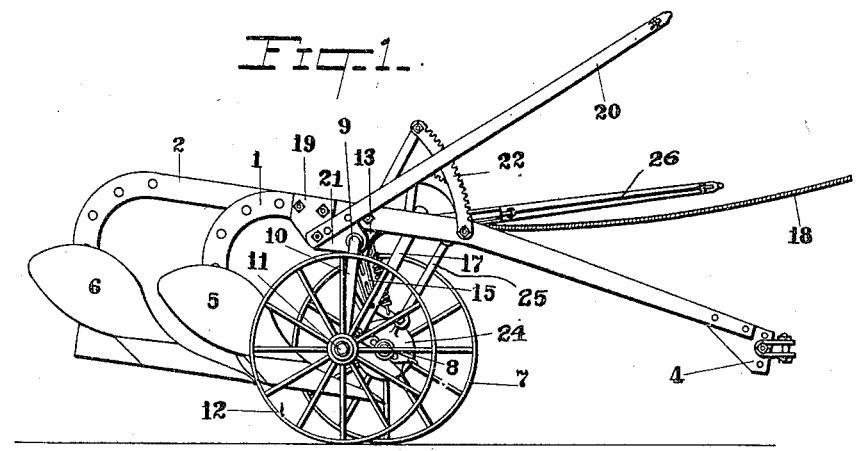
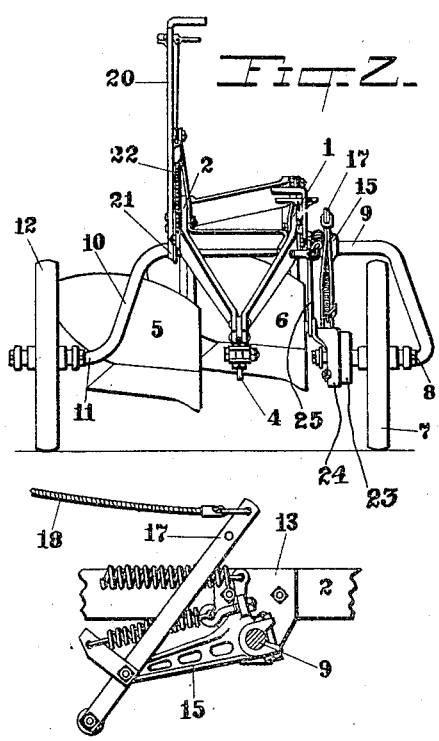
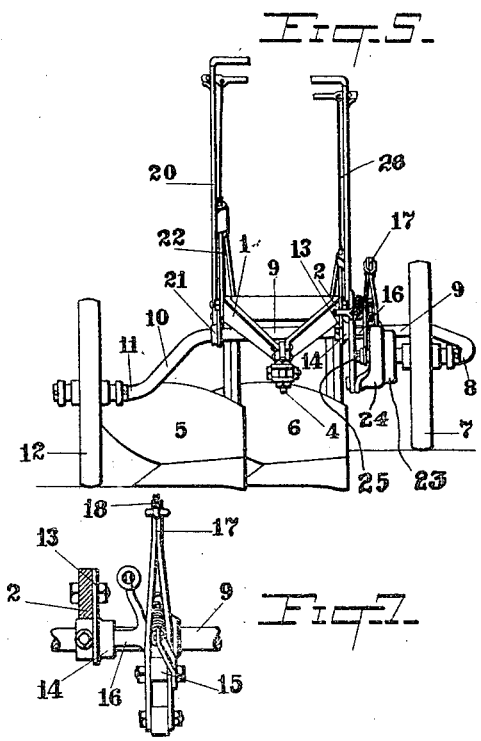

Sept. 23, 1924.
C. G. STRANDLUND
WHEEL PLOW
Original Filed Aug. 8, 1918   2 Sheets-Sheet 2
1,509,115
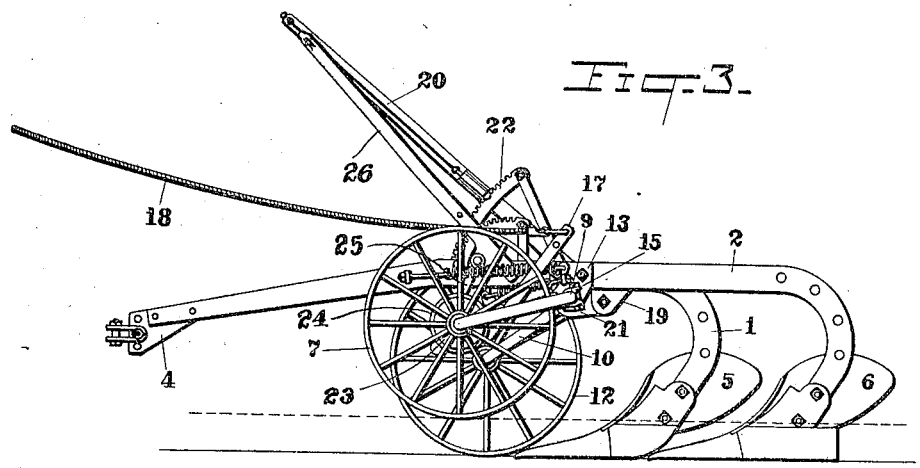
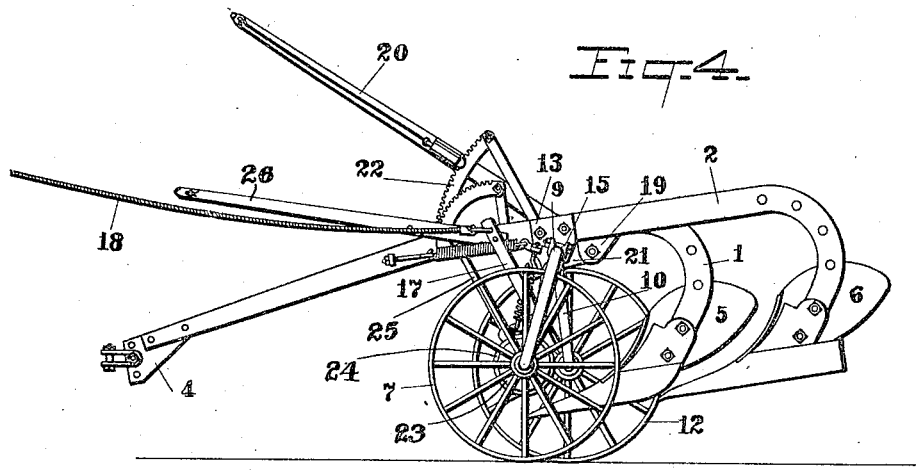

Patented Sept. 23, 1924.

1,509,115

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

WHEEL PLOW.

Application filed August 8, 1918. Serial No. 248,993. Renewed April 14, 1923.

*To all whom it may concern:*

Be it known that I, CARL G. STRANDLUND, a citizen of the United States, residing at Moline, in the county of Rock Island and State of Illinois, have invented certain new and useful Improvements in Wheel Plows, of which the following is a specification, reference being had therein to the accompanying drawing.

My invention relates to sulky plows and has for its objects the construction of a plow adapted to be drawn either by horse power or tractor, simple in operation, economical in manufacture, which is readily adjustable to the conditions of work, and in which the plow bodies are automatically raised at the will of the operator.

Referring to the drawings, in which similar numerals indicate identical parts—

Figure 1 is a side elevation of my improved plow with the plow bodies raised from the ground.

Figure 2 is a front elevation of Figure 1.

Figure 3 is a side elevation with the plow bodies in operative position.

Figure 4 is a side elevation viewed from the landward side with the plow bodies raised as in Figure 1.

Figure 5 is a front elevation of Figure 3.

Figure 6 is a detail of the connection of the axle to the landward plow beam, and Figure 7 is a front view of Figure 6.

As stated, the plow bodies are automatically raised at the will of the operator; this is accomplished by employing the traction power of one of the wheels, preferably the land wheel, and connecting the land wheel to a rockable axle by means of lifting mechanism which is tripped into actuation at the will of the operator and automatically becomes inactive when the plow bodies have been raised. Preferably I employ the lifting mechanism shown and described in my pending application filed May 20, 1918, Serial No. 235,565, to which reference is made for a detail description thereof. Said lifting mechanism comprises a constantly rotating clutch member 23 connected with the hub of the land wheel 7 so as to rotate therewith; a normally stationary clutch member 24 that co-operates with the clutch member 23 and is driven thereby when the tripping lever hereinafter described is actuated by the operator; a link 25 by which power is transmitted from the clutch member 24 to the plow body supporting frame; and an adjustable lever 26 mounted on the frame, and with which the upper end of said link is connected, as best shown in Figures 3 and 5. The arrangement of these parts is such that when the clutch members 23, 24 are operatively connected together, the traction power of the land wheel 7 applied through the link 25 lifts the plow body supporting frame and causes the ground wheels to move backward and the axle to swing to a more nearly vertical position, as illustrated in Figure 4.

The main frame is composed of the plow beams 1 and 2 spaced apart by a strut which is bolted securely to both beams. The beams 1 and 2 converge forwardly, and between their forward ends is a clevis 4, the beams and the clevis being riveted together. The rearward portions of the beams are bent downwardly to accomodate the plow bodies 5 and 6 which are rigidly secured thereto. The beams 1 and 2 are supported on a wheel frame in the form of a crank axle which extends transversely of the beams 1 and 2; landwardly the axle is bent downwardly and terminates in a horizontal portion 8, extending furrowward and parallel to the main part 9 of the axle on which the beams are supported; on the portion 8 is mounted the landwheel 7 normally rotating freely, and provided with the clutch mechanism, referred to in the application above noted, by which the traction power of the wheel 7 can be employed at will to raise the plow. In bending the axle in this manner I secure a better balance to the plow, and at the same time, the mechanism for operating the clutch and the clutch itself, is located between the land wheel and the plow beams materially simplifying the construction and operation.

The furrowward portion 10 of the axle is inclined downwardly and terminates in a horizontal portion 11, on which is mounted the furrowwheel 12, the portion 10 having a rearward inclination when the plow is raised. The beam 2 is secured to the axle by a plate or bearing 13, bolted to the beam and provided with a suitable opening through which the axle extends; a collar 14, preferably integral with the bearing 13, is provided to give sufficient bearing surface for the axle which is loosely held therein to permit a limited rocking movement laterally of the frame; i. e. about a longitudinal axis. An arm 15 is rigidly clamped on the axle and has an extension 16 which contacts with the collar 14; the arm 15 extends downwardly to form a support for the tripping lever 17 through the actuation of which the clutch mechanism is brought into operation for the purpose stated. The usual cable 18 extends from the tripping lever to the tractor within convenient reach of the operator.

On the beam 1 is rigidly mounted a downwardly projecting support 19 and to it is pivotally secured a lever 20; a member 21 extends forwardly from the pivoted end of the lever and is provided with a bearing in which the furrowward part of the portion 9 of the axle is rockably journaled. I prefer making the member 21 separate from the lever 20 and secure it thereto by suitable bolts or rivets, but it is obvious that it can be made integral with the lever. Mounted on the beam 1 is a segmental rack 22 with which a latch, of the usual type on the lever 20, is adapted to engage.

Presuming that the plow is to be lowered, the clutch part holding it in a raised position is tripped by the operator and the plow drops by its own weight, the wheels moving forwardly as the axle rocks. At this time if the ground has not been broken previously the plow bodies enter the ground for the first furrows. On the next round, in the operation of plowing, the furrow wheel will travel in the furrow and if the beams 1 and 2 were secured to the axle the plows would be tilted, this defect I remedy by actuation of the lever 20 in a forward direction, and as it is pivoted on the support 19, with its fulcrum on the axle, the frame is rocked relatively to the axle and about a longitudinal axis to raise its furrowward side to the desired position to bring it in a parallel relation with the ground, so that the plows are kept level with the ground at any depth of plowing of which the plow is capable, the frame being normally parallel with the ground surface and resting on the axle when the wheels are level. When the plow is raised it is obvious that the latch on the lever 20 must be released from the segmental rack 22, so that the lever 20 can move rearwardly until the axle and beams 1 and 2 are level with relation to the ground. As shown in Figures 3 and 5, the link 25, through which the traction power of the land wheel 7 is transmitted to the plow-body carrying frame, is connected at its upper end with the lever 26, which in turn is connected with said frame, the connection between said link and said lever being adjacent to the longitudinal vertical plane of the bearing collar 14 which constitutes the axis about which the beam supporting frame rocks for levelling purposes. By this arrangement the proper operative relationship between said link and the frame is maintained regardless of the relative position of the ground wheels to each other;— that is to say, whether the furrow wheel is traveling on a relatively high line or a relatively low one. Obviously since the thrust of the lifting power is delivered to the frame in a plane adjacent to that of the pivot about which the frame rocks, the angular position of the frame with relation to the axle does not affect the advantageous transmission of power to said frame. The best results are obtained by so arranging the lifting mechanism that the lower end of the link also is approximately in the same vertical plane as its upper end, as shown in Figures 2 and 5.

I have produced a simple and effective plow, readily adjustable to keep the plow level at any depth of plowing, and while I have shown my improvements as applied to a plow with two plow bodies, they are equally applicable to a plow having one plow body or more than shown.

What I claim is—

1. In a wheeled plow, the combination of a frame carrying one or more plow bodies, a support therefor comprising a transverse axle having a landwheel and a furrowwheel mounted thereon and adapted to be rocked to move the wheels simultaneously forwardly or rearwardly to lower or raise the plow, means operable at will to raise the plow by traction power of one of said wheels, and means to adjust the frame to parallelism with the ground at any point in the operation of raising or lowering and irrespective of the plow raising or lowering movement of the wheels.

2. In a wheeled plow, the combination of a frame carrying one or more plow bodies, a support therefor comprising a transverse crank axle having a landwheel and a furrowwheel mounted thereon and adapted to be rocked to move the wheels simultaneously forwardly or rearwardly to lower or raise the plow, means operable at will to rock said axle by traction power of the landwheel, and means to adjust the frame to parallelism with the ground at any point in the operation of raising or lowering irrespective of the plow raising or lowering movement of the wheels.

3. In a wheeled plow, the combination of a frame carrying one or more plow bodies, a rockable crank axle extending transversely of the frame and flexibly connected to one side thereof, supporting wheels on the axle, means to rock said axle and move said wheels simultaneously forwardly or rearwardly to vary the height of the frame above the ground, and means connecting the other side of the frame with the axle and operable to adjust the frame to parallelism with the ground irrespective of the plow raising or lowering movement of the wheels.

4. In a wheeled plow, the combination of a frame carrying one or more plow bodies, a transverse crank axle journaled on one side of the frame and having a landwheel and a furrowwheel mounted thereon, means to rock said axle and move the wheels forwardly or rearwardly to lower or raise the plow, and means connecting the other side of the frame and the axle and operable irrespective of the plow raising or lowering movement of the wheels to bring the frame into parallel relation with the ground.

5. In a wheeled plow, the combination of a frame carrying one or more plow bodies, a transverse crank axle journaled on the landwheel side of the frame and having a landwheel and a furrowwheel mounted thereon, means to rock said axle and move the wheels forwardly or rearwardly to lower or raise the plow, and means connecting the furrowward side of the frame and the axle and operable irrespective of the plow raising or lowering movement of the wheels to bring the frame into parallel relation with the ground.

6. In a wheeled plow, the combination of a frame carrying one or more plow bodies, supporting wheels therefor mounted on a rockable crank axle extending transversely of the frame and flexibly connected to the landward side thereof, means to rock said axle and move the wheels forwardly or rearwardly to lower or raise the plow, and means connecting the furrowward side of the frame with the axle and operable irrespective of the plow raising or lowering movement of the wheels to bring the frame into parallel relation with the ground.

7. In a wheeled plow, the combination of a frame carrying one or more plow bodies, supporting wheels therefor mounted on a rockable crank axle extending transversely of the frame, a bearing mounted on the landward side of the frame, in which the axle is journaled to rock forwardly or rearwardly or laterally, means to rock the axle and move the wheels forwardly or rearwardly to lower or raise the plow, and means connecting the furrowward side of the frame with the axle and operable irrespective of the plow raising or lowering movement of the wheels to bring the frame into parallel relation with the ground.

8. In a wheeled plow, the combination of a frame carrying one or more plow bodies, supporting wheels therefor mounted on a rockable crank axle extending transversely of the frame, a bearing secured to the landward side of the frame in which the axle is journaled to rock longitudinally and laterally of the frame, means to rock the axle and move the wheels forwardly or rearwardly to lower or raise the plow, and means connecting the axle and the furrowward side of the frame and operable to adjust the frame to parallelism with the ground when the axle is rocked laterally.

9. In a wheeled plow, the combination of a frame carrying one or more plow bodies, supporting wheels therefor mounted on a rockable crank axle extending transversely of the frame, a bearing secured to the landward side of the frame in which the axle is journaled to rock longitudinally and laterally of the frame, means to rock the axle and move the wheels forwardly or rearwardly to lower or raise the plow, and a lever pivotally supported on the frame and connected to the axle and operable to adjust the frame to parallelism with the ground when the axle is rocked laterally.

10. A wheeled plow, comprising a frame carrying one or more plow bodies, and land and furrow wheels mounted on cranks at opposite sides of said frame and movable fore and aft to raise or lower the frame, said frame being arranged to rock about a longitudinal axis to move its furrowward side vertically toward or from the furrowward crank for leveling the plow bodies, and being provided with means whereby it may be rocked and held in different positions of adjustment.

11. A wheeled plow comprising a frame carrying one or more plow bodies, land and furrow wheels, cranks on which said wheels are mounted and with which said frame is pivotally connected, whereby said frame may be raised or lowered by fore and aft movement of said wheels, said frame being mounted to rock relatively to said cranks about a longitudinal axis to maintain its transverse parallelism with the ground, and means for so rocking said frame.

12. In a wheeled plow the combination of a frame carrying one or more plow bodies, a transverse crank axle, said frame being pivotally connected with said axle and being adapted to be rocked relatively thereto about a longitudinal axis to maintain its transverse parallelism with the ground, wheels supporting the end portions of said axle and movable fore and aft to vary the height of said frame from the ground, and means for so rocking said frame.

13. In a wheeled plow, the combination with a frame carrying one or more plow bodies, land and furrow wheels, means supporting said frame on said wheels (and arranged to permit the wheels to run on different levels,) said wheels being movable fore and aft to raise or lower the plow bodies, said frame being pivotally connected with said supporting means to rock relatively thereto about a longitudinal axis, means for so rocking said frame, and optionally controlled traction-operated lifting mechanism actuated by one of said wheels, arranged to apply lifting power to said frame at a point adjacent to the longitudinal vertical plane of the axis about which said frame rocks.

14. In a wheeled plow, the combination with a frame carrying one or more plow bodies, land and furrow wheels, a transversely disposed double crank axle supporting said frame, with which said frame is pivotally connected to rock relatively thereto about a longitudinal axis, means for so rocking said frame, said wheels being mounted on the cranks of said axle and being movable fore and aft to raise or lower the plow bodies, and optionally controlled traction-operated lifting mechanism actuated by one of said wheels, arranged to apply lifting power to said axle at a point adjacent to the longitudinal vertical plane of the axis about which said frame rocks.

15. In a machine of the class described, the combination of the beam frame, the wheels, the crank carrying one of the wheels and journaled to rock longitudinally in a bearing fixed vertically relatively to both the frame and the crank axis, a second crank for the other wheel rockable longitudinally and movable bodily vertically relatively to the beam frame, and an automatic, optionally controlled, traction-operated lifting mechanism actuated by a ground wheel and arranged to apply lifting power to the frame at a point adjacent to the longitudinal vertical plane of said fixed bearing.

16. In a machine of the class described, the combination of the beam, the wheels, the crank carrying one of the wheels and journaled in a bearing to rock longitudinally, said frame being, at points near the bearing, held vertically fixed relatively to the crank axle, a second crank for the other wheel rockable longitudinally and movable bodily vertically relatively to the beam, means for adjusting the second crank vertically, and an automatic, optionally controlled, traction-operated lifting mechanism actuated by a ground wheel and arranged to apply lifting power to the frame at a point adjacent to the longitudinal vertical plane of said bearing.

17. In a machine of the character described, the combination of a wheel frame, supporting wheels therefor adapted to be moved forwardly or rearwardly to raise or lower the frame, means to move said wheels, a plow carrying frame pivotally supported on the wheel frame and rockable laterally, and a plow carried by the plow carrying frame and swung laterally by the rocking thereof.

CARL G. STRANDLUND.